United States Patent [19]
Thompson

[11] 3,719,009
[45] March 6, 1973

[54] SANDBLASTING MOTOR STATOR SLOTS

[76] Inventor: Thomas L. Thompson, 1138 Nishey Lake Road S. W., Atlanta, Ga. 30331

[22] Filed: Sept. 20, 1971

[21] Appl. No.: 182,096

[52] U.S. Cl.................................................51/319
[51] Int. Cl..............................................B24c 1/00
[58] Field of Search.....................51/11, 319–321, 51/244

[56] References Cited

UNITED STATES PATENTS

| | | | |
|---|---|---|---|
| 3,482,423 | 12/1969 | Murray | 51/319 X |
| 2,792,671 | 5/1957 | Sprigg | 51/11 |

Primary Examiner—Donald G. Kelly
Attorney—Cushman, Darby & Cushman

[57] ABSTRACT

Method of removing material such as burned shellac, paper residue, insulation, dirt, grease, etc. from stator slots of electric motors preparatory to rewinding with a nozzle having an oblong hollow ceramic member which is force fitted at one end into a rubber stopper and having its other end beveled for fitting into the slots and a metal coupler for connecting the member to a suitable sand blasting source. The beveled end and oblong shape permit the nozzle to be easily inserted in the stator slots and to effectively remove the material in a short period of time without damage to the exterior of the slots in contrast to a nozzle having other shapes. Broken or worn ceramic members can be easily and quickly replaced by removal from the stopper and force fitting a new ceramic member in place.

1 Claim, 3 Drawing Figures

SANDBLASTING MOTOR STATOR SLOTS

BRIEF DESCRIPTION OF THE PRIOR ART AND SUMMARY OF THE INVENTION

This invention relates to a method of sandblast-cleaning stator slots of an electric motor preparatory to rewinding.

When a large electrical motor fails, there is seldom any damage to most of the components thereof, including the stator, and accordingly the motor can be usually rebuilt by replacing the windings in the proper slots of the stator and/or rotor. Unfortunately, when a motor starter or generator fails, it is usually because the coils have burned out, leaving the slots clogged with burned shellac or varnish and residues of paper, insulation, dust, grease and other material which must be thoroughly cleaned out before new windings can be placed in the slots.

In the past, chemicals have been used to clean the slots by soaking and recently a heating technique has been employed whereby the stator is subjected to a gradually increasing temperature which reduces the foreign material in the slots to a burned dust which can then be blown out with a conventional air compressor hose. However, both of these approaches are cumbersome, are extremely slow, cause undesirable damage to the stator and produce polluted air which is both obnoxious and unhealthful.

The present invention relates to a sand blasting nozzle particularly designed for use in cleaning out the slots of stators and to a method of cleaning out such slots employing such a nozzle. In the embodiment of the invention described in detail below, the nozzle includes a hollow ceramic member having an oval passage in cross section an oblong shape and a beveled end. The ceramic member is preferably force fitted at the end opposite the beveled end into a rubber stopper which is in turn mounted in a coupling member for attaching the nozzle to conventional sand blasting equipment. The beveled end of the nozzle permits the ceramic member to be fitted directly into slots of all sizes and the oblong shape of the ceramic passage enables a maximum surface of sand blasting material to be blown through the nozzle and impinge upon the cleaning area. The oval passage shape also causes the abrasive to be directed so as to avoid damage to the exterior of the stator such as results when a conventional sand blasting nozzle is employed. If the ceramic member becomes worn or broken, it can be easily removed from the rubber stopper and another member quickly and easily force fitted into the stopper. By using such a nozzle, stator slots can be quickly and easily cleaned.

Many other objects and purposes of the invention will become clear from the following detailed description of the drawings.

DETAILED DESCRIPTION OF THE DRAWINGS

Figure 2:
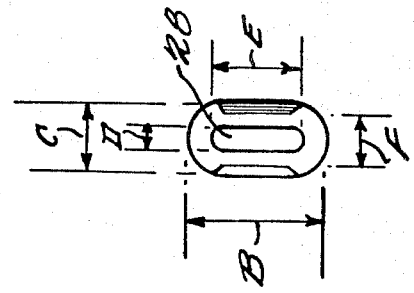
FIG. 2 shows an end view of the nozzle of FIG. 1.
Figure 1:
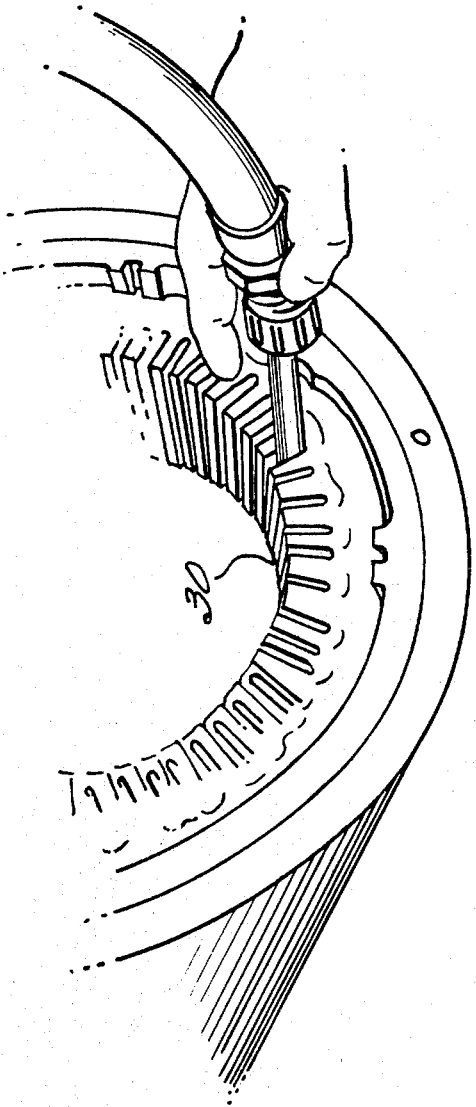
FIG. 1 shows a cut-away view of the novel nozzle of this invention.

Reference is now made to FIG. 1 which shows a cutaway view of the novel nozzle 20 of this invention which includes metallic coupling member 22, compression washer 23, rubber stopper 24 and ceramic member 26. As shown, ceramic member 26 which has an interior passage 28 as can be seen in FIG. 2, is preferably force fitted into an interior passage through stopper 24 which is rubber or other similar material. Stopper 24 is preferably bonded to member 22 and any suitable bonding can be employed for this purpose. Member 26 is preferably ceramic material, and material of the type sold under the trademark "ALSIMAG" by the American Lava Corporation has been found to be satisfactory, although other ceramic materials can, of course, be employed.

As can be seen in FIG. 2, the exterior surface of ceramic member 26 is preferably oblong in cross section as is the hollow passage in its interior through which the sand or other abrasive moves. By employing a ceramic member having an oblong exterior surface, member 26 can be easily and simply inserted into stator slots where a round shaped or other shaped member could not. Further, the oval shaped interior passage permits a maximum surface within the stator slot to be exposed to the abrasive moving through interior passage 28.

It has been found that a round opening of sufficient size to satisfactorily remove material produces a blast which tends to damage the surface edges of the slots. Different round configurations for the interior passage have been tried but none has been found to be as satisfactory as the particular configuration depicted in FIG. 1. The slot area to be cleaned is in effect a trapezoidal shape, and thus, it is believed, can be completely cleaned much more readily with the type of nozzle shown in the drawings of this application than with round or other shaped nozzles such as are commercially available.

The end of the nozzle from which the abrasive exits is preferably beveled as shown in order to be more easily movable within the slot and to fit into smaller slots for cleaning. The nozzle 20 shown in FIGS. 1 and 2 can be used with any type of suitable sand blaster, and it has been found to be particularly useful in connection with a Clemco model ADCFM 2232 blast cabinet with an integral dust collector. Such devices are available from Clemco-Clementina Ltd., but any suitable source of abrasive material can be alternatively employed.

Figure 3:
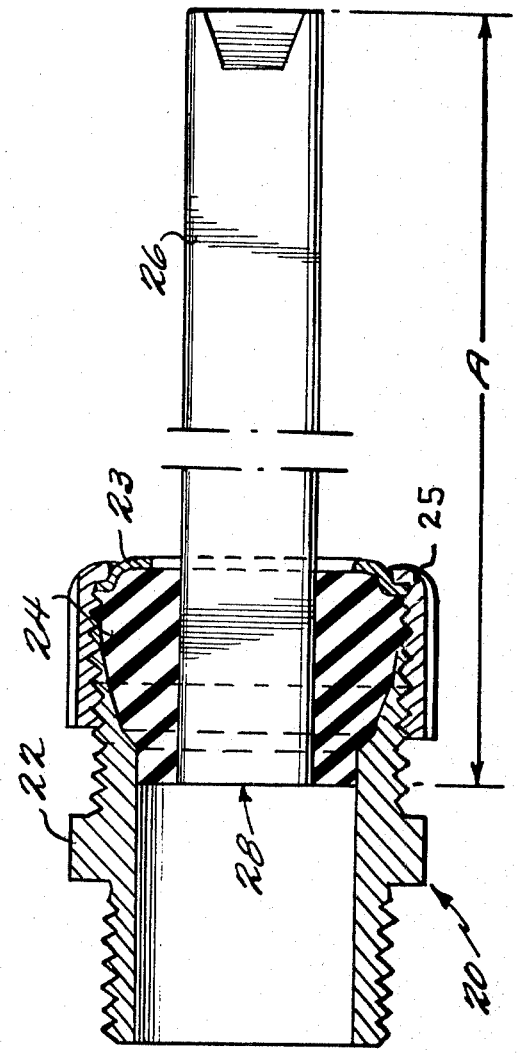
FIG. 3 shows the novel nozzle of this invention in use in cleaning the slots of a conventional stator.

FIG. 3 shows the novel nozzle 20 of this invention in use cleaning out a stator 30. As shown, the nozzle 20 is simply inserted into the slot, and the interior of the slot subjected to the abrasive issuing from the open end of the nozzle until all undesirable material has been removed, and the stator slot is clean and ready for the new windings. The shape of the nozzle prevents damage to the outside of the laminations since the abrasive is directed inside the slots in contrast to conventional sand blasting nozzles. If ceramic member 26 becomes broken or worn during the operation, it can be simply and easily replaced by removing it from the stopper 24 and force fitting a new member 26 in place.

Many changes and modifications in the above embodiment of the invention can, of course, be made without departing from the scope of the invention, and accordingly that scope is intended to be limited only by the scope of the appended claims.

What is claimed is:

1. A method of cleaning a stator slot of an electric motor comprising the steps of:

inserting a ceramic member having a substantially oblong interior passage, an oblong exterior shape with two opposing substantially flat surfaces and an end beveled on said flat surfaces into said slot, and connecting a source of abrasive for blasting to said member so that abrasive passes through said interior passage and impinges on the interior of said slot to remove material therefrom.

* * * * *